United States Patent [19]
Henn et al.

[11] Patent Number: 5,496,864
[45] Date of Patent: Mar. 5, 1996

[54] EXPANDABLE STYRENE POLYMERS

[75] Inventors: Rolf Henn, Ketsch; Klaus Hahn, Kirchheim; Hans Hönl, Obersülzen; Walter Heckmann, Weinheim; Karl-Heinz Wassmer, Limburgerhof; Erich Klement, Rimbach; Joachim Fischer, Grosskarlbach, all of Germany

[73] Assignee: BASF Aktiengesellschaft, Ludwigshafen, Germany

[21] Appl. No.: 439,898

[22] Filed: May 12, 1995

[30] Foreign Application Priority Data

May 13, 1994 [DE] Germany .................. 44 16 852.7

[51] Int. Cl.$^6$ ...................... C08J 9/16; C08J 9/20
[52] U.S. Cl. ............... 521/59; 521/56; 521/60; 521/149; 521/150
[58] Field of Search ................. 521/56, 59, 60, 521/149, 150

[56] References Cited

U.S. PATENT DOCUMENTS

| | | |
|---|---|---|
| 3,281,383 | 10/1966 | Zelinski et al. . |
| 4,307,134 | 12/1981 | Milkovich et al. . |
| 4,333,970 | 6/1982 | Blommers et al. . |
| 4,409,338 | 10/1983 | DiGiulio et al. . |
| 4,423,160 | 12/1983 | DiGiulio . |
| 4,424,285 | 1/1984 | DiGiulio . |

FOREIGN PATENT DOCUMENTS

| | | |
|---|---|---|
| 106129 | 4/1984 | European Pat. Off. . |
| 0561216 | 3/1993 | European Pat. Off. . |
| 1220611 | 1/1971 | United Kingdom . |

*Primary Examiner*—Morton Foelak
*Attorney, Agent, or Firm*—Keil & Weinkauf

[57] ABSTRACT

The invention relates to expandable styrene polymers for elastic polystyrene foams, comprising
a) from 50 to 75% by weight of polystyrene and/or a styrene copolymer containing at least 50% by weight of copolymerized styrene,
b) from 5 to 30% by weight of a styrene-soluble elastomer,
c) from 5 to 20% by weight of at least one block copolymer containing styrene as one component,
d) from 15 to 50% by weight of at least one polyolefin,
e) from 1 to 15% by weight, based on the sum of a) and b), of a low-boiling blowing agent, and, if desired,
f) conventional additives in effective amounts,
and to foams produced therefrom.

11 Claims, No Drawings

EXPANDABLE STYRENE POLYMERS

The present invention relates to expandable styrene polymers which are suitable for the production of elastic foams.

Foams based on expandable polystyrene particles have achieved considerable industrial importance as thermal insulation and packaging materials. They are produced on an industrial scale by first preparing expandable styrene polymers by suspension polymerization of styrene in the presence of a blowing agent, expanding these polymers by heating to give foam particles, and subsequently welding the particles in molds to give moldings.

Polystyrene foams are rigid. Their low elasticity is disadvantageous for many applications, for example in the packaging sector, since protection of the packaged goods against impact is only possible to an inadequate extent, and the foam moldings used as packaging materials break even on only small deformation.

Attempts have therefore already been made in the past to increase the elasticity of polystyrene foams.

EP-A-561 216 describes a process for elastifying polystyrene foams, in which foam slabs having a density from 8 to 12 kg/m$^3$ are compressed to about ⅓ of their size in one direction and then released again. Boards cut from the slabs treated in this way have increased elasticity and are used, for example, for solid-borne sound insulation.

However, the technicalities of the process mean that this procedure is very difficult to apply to moldings and is therefore not carried out.

Thus, it is known to incorporate elastomeric polymers into styrene polymers and to foam the resultant polymers after impregnation with volatile blowing agents.

However, the poor miscibility of the elastomers in polystyrene frequently result in incompatibility between the polymers. In addition, the mechanical properties of the foams produced in this way are usually unsatisfactory.

U.S. Pat. No. 4,692,471 describes expandable interpolymer particles prepared by polymerization of styrene-dissolved polyolefins, for example polyethylene or polypropylene, and a copolymer of propylene and another olefin having a melting point of below 150° C. However, these polymers have the disadvantage that compatibility promoters must be incorporated into the polymer in a separate process step.

DE-A-41 24 207 describes expandable styrene polymers for the production of rapidly demoldable foam moldings. These polymers contain polystyrene as stationary phase in which an amorphous polyalpha-olefin is uniformly distributed as non-stationary phase. These polymers are prepared by dissolving the polyolefins in styrene, followed by polymerization. The advantage of these polymers is the short cooling time, but their elastification is unsatisfactory. Furthermore, a common feature of all the described processes of the prior art is that the blowing agent diffuses out of the beads very rapidly. After only a few days, the loss of blowing agent can be so high that proper foaming of the beads is no longer possible.

DE-A-38 14 783 describes interpolymers of polystyrene and ethylene-vinyl acetate copolymers. These products have good elasticity, but the blowing agent again escapes from the polymer particles very rapidly.

It is an object of the present invention to provide expandable styrene polymers which are suitable for the production of elastic foams, only lose small amounts of blowing agent, or none at all, even after extended storage, and are recyclable.

We have found that this object is achieved by expandable styrene polymers for elastic polystyrene foams, comprising a) from 50 to 75% by weight of polystyrene and/or a styrene copolymer containing at least 50% by weight of copolymerized styrene, b) from 5 to 30% by weight of at least one styrene-soluble elastomer, c) from 5 to 20% by weight, based on the sum of a) and b), of at least one block copolymer containing styrene as one component, d) from 15 to 50% by weight, based on the sum of a) to d), of at least one polyolefin, e) from 1 to 15% by weight, based on the sum of a) to d), of a low-boiling blowing agent, and, if desired, f) conventional additives in effective amounts, where, in the unfoamed polystyrene beads, component b) is in the form of cell particles and component c) is in the form of particles having a mean size of from 0.2 to 2 μm in the polystyrene phase.

The present invention accordingly provides expandable styrene polymers for elastic polystyrene foams, comprising a) from 50 to 75% by weight of polystyrene and/or a styrene copolymer containing at least 50% by weight of copolymerized styrene, b) from 5 to 30% by weight of at least one styrene-soluble elastomer, c) from 5 to 20% by weight of at least one block copolymer containing styrene as one component, d) from 15 to 50% by weight of at least one polyolefin, e) from 1 to 15% by weight, based on the sum of a) to d), of a low-boiling blowing agent, and, if desired, f) conventional additives in effective amounts, where, in the unfoamed polystyrene beads, component b) is in the form of cell particles and component c) is in the form of particles having a mean size of from 0.2 to 2 μm in the polystyrene phase.

The present invention furthermore provides elastic foams having a density of from 5 to 70 g/l, comprising a) from 50 to 75% by weight of polystyrene and/or a styrene copolymer containing at least 50% by weight of copolymerized styrene, b) from 5 to 30% by weight of at least one styrene-soluble elastomer, c) from 5 to 20% by weight, based on the sum of a) and b), of at least one block copolymer containing styrene as one component, d) from 15 to 50% by weight of a polyolefin, and, if desired e) conventional additives in effective amounts the preparation of the styrene polymers and moldings produced from the elastic foams.

Component a) in the expandable styrene polymers comprises from 75 to 98% by weight, preferably from 85 to 93% by weight, of polystyrene and/or a styrene copolymer containing at least 50% by weight, preferably at least 80% by weight, of copolymerized polystyrene. Examples of suitable comonomers are α-methylstyrene, ring-halogenated styrenes, ring-alkylated styrenes, acrylonitrile, esters of acrylic or methacrylic acid with alcohols having 1 to 8 carbon atoms, N-vinylcarbazole, maleic acid and maleic anhydride. The polystyrene advantageously contains a small amount of a copolymerized crosslinking agent, ie. a compound containing more than one, preferably 2, double bonds, such as divinylbenzene, butadiene or butanediol diacrylate. The crosslinking agent is generally used in amounts of from 0.005 to 0.05 mol %, based on styrene.

In order to achieve particularly high expandability, it is expedient for the styrene polymer to have a mean molecular weight $M_w$ (weight average), measured by the GPC method, of from 100,000 to 200,000, in particular from 130,000 to 180,000. The foam has improved processing properties if the high-molecular-weight flank of the molecular-weight distribution curve measured by the GPC method is so steep that the difference between the means $(M_{z+1}-M_z)$ is less than 150,000. The GPC method is described in G. Glöckler, Polymercharakterisierung, Chromatographische Methoden, Volume 17, Hüthig-Verlag, Heidelberg, 1982. These means are described in H. G. Elias, Makromoleküle, Hüthig-Verlag, Heidelberg, 1971, pages 52–64.

Styrene polymers which have the abovementioned mean molecular weights can be obtained by carrying out the polymerization in the presence of regulators. The regulators used are expediently from 0.01 to 1.5% by weight, preferably from 0.01 to 0.5% by weight, of a bromine-free organic compound having a chain-transfer constant K of from 0.1 to 50. Addition of the regulator during the polymerization is expediently delayed until a conversion of from 20 to 90% has been reached in order to achieve a steep high-molecular-weight flank of the molecular-weight distribution curve.

An advantageous high expansion capacity can also be achieved if component a) contains from 0.1 to 10% by weight, advantageously from 0.5 to 10% by weight, of a styrene polymer having a mean molecular weight (weight average) of from 500 to 5000.

Further details on molecular-weight regulation in the preparation of expandable styrene polymers are given in EP-B 106 129.

Styrene polymers which contain from 0.1 to 2% by weight, preferably from 0.15 to 1.5% by weight, of copolymerized acrylonitrile give foams which are distinguished by substantial absence of shrinkage. A mixture of from 95 to 99.5% by weight of polystyrene and from 0.5 to 5% by weight of a styrene-soluble styrene-acrylonitrile copolymer also exhibits these properties if the total acrylonitrile content in the mixture is from 0.1 to 2% by weight, preferably from 0.15 to 2% by weight.

Styrene polymers containing from 3 to 20% by weight, preferably from 5 to 15% by weight, of copolymerized acrylonitrile give foams having high oil resistance. A mixture of from 50 to 85% by weight of polystyrene and from 15 to 50% by weight of a styrene-soluble styrene-acrylonitrile copolymer also exhibits this advantageous property if the total acrylonitrile content in the mixture is from 3 to 20% by weight, preferably from 5 to 15% by weight. Such mixtures are prepared in a simple manner by dissolving the proposed amount of styrene-acrylonitrile copolymer in styrene before the polymerization.

Styrene polymers containing from 2 to 15% by weight, in particular from 3 to 12% by weight, of maleic acid or maleic anhydride as comonomer give foams which are distinguished by high heat distortion resistance.

Component b) is, in particular, a styrene-soluble elastomer having a glass transition temperature of below 20° C., preferably below −10° C., in particular below −20° C.

The elastomer is generally essentially uncrosslinked, if desired only crosslinked to the extent that the solubility in styrene is not impaired.

Preference is given for the novel styrene polymers to polybutadiene rubbers, in particular those having molecular weights of from 200,000 to 300,000 and containing <50% of 1,4-cis structures and from 5 to 20% of 1,2-vinyl structures (medium-cis structure) or from 50 to 99% of 1,4-cis structures and <5% of 1,2-vinyl structures (high-cis structure).

Component c) is a conventional block copolymer comprising styrene and at least one further olefinically unsaturated monomer, where the styrene content of the block copolymer is preferably at least 50% by weight.

The further olefinically unsaturated monomers employed are in particular those containing one or two olefinic double bonds, in particular butadiene, isoprene or mixtures thereof. Particularly suitable are block copolymers having a two-block or three-block structure. The blocks of the block copolymers can be separated by sharp transitions, but it is also possible to incorporate tapered transitions between the blocks. In this case, there are regions between the blocks in the polymer chain in which the monomers are randomly arranged.

The block copolymers can be linear, branched or dendritic.

It is furthermore possible to employ block copolymers in which some or all of the double bonds remaining after the polymerization have been hydrogenated.

Further details on the block copolymers used and their preparation are given, for example, in U.S. Pat. No. 3,281,383.

Component d) is a polyolefin, preferably polyethylene and/or polypropylene. Also suitable are copolymers of ethylene and/or propylene with other olefinically unsaturated monomers, for example ethylene-vinyl acetate copolymers (EVA copolymers).

Polyethylene is particularly suitable, particularly favorable results being achievable with linear polyethylene having a density in the range from 0.940 to 0.965 g/cm$^3$. Polyethylene grades of this type are known as HDPE.

In the novel expandable styrene polymers, component b) is in the form of cell particles and components c) and d) are in the form of irregular particles in the polystyrene phase. The cell particles should have diameters of from 0.1 to 10 μm, in particular from 0.5 to 5 μm.

Cell particles having relatively large diameters in the expandable styrene polymers result in losses of blowing agent and in irregular cell structures in the foams produced.

Details on the morphology of elastomer-modified styrene polymers are given in Echte, Rubber-Toughened Styrene Polymers, Advances in Chemistry Series No. 222, 1989.

As component c), the expandable styrene polymers contain, in homogeneous distribution, from 2 to 15% by weight, preferably from 3 to 10% by weight, of a low-boiling blowing agent. The blowing agent should not dissolve the polystyrene, but should be soluble in polystyrene. The boiling point should be below the softening point of the polystyrene. Examples of suitable blowing agents are propane, butane, pentane, hexane, cyclopentane, cyclohexane, octane, dichlorodifluoromethane, trifluorochloromethane and 1,1,1-difluorochloroethane. Pentane is preferred.

The expandable styrene polymers may furthermore contain effective amounts of conventional additives, such as dyes, fillers, stabilizers, flameproofing agents, synergists, nucleating agents, lubricants, antistatics, substances which have a non-stick action during foaming, and agents for shortening the demolding time on expansion.

The novel styrene polymers can be prepared for example by mixing components a), b), c), d) and, if used, e) in the melt, usually in an extruder, where, during addition of e), the extrudate must be cooled so rapidly after extrusion that foaming does not occur. The resultant styrene polymer is subsequently comminuted, usually by granulation.

It is furthermore possible to dissolve components b) and/or c) in styrene and to polymerize this solution, in which case the polymerization is preferably carried out in bulk, and the other components are added by mixing in the melt.

In this process, components b) and/or c) are dissolved in styrene and this solution is polymerized by processes known per se, usually with addition of free-radical initiators or by the supply of heat.

It is also possible to carry out this polymerization in bulk to a conversion of about 30%, to suspend the resultant polymer in a known manner and to complete the polymerization in suspension.

Polymerization processes of this type are described, for example, in DE-B-26 13 352.

Particularly favorable results are achieved if the styrene polymers are prepared by bulk polymerization of a solution of component b) in styrene and mixing this polymer with components c) and d). The polymerization here is carried out as described above.

The mixing of the polymer with components c) and d) can be carried out, in particular, by extrusion in the melt.

In this procedure, the styrene polymer must subsequently be impregnated with the blowing agent e). This can be achieved, for example, by adding the blowing agent to the molten polymer during incorporation of components c) and d), for example during extrusion; here too, foaming must be prevented.

However, the blowing agent is advantageously added by the impregnation method. To this end, the resultant polymers must be comminuted. This is expediently carried out by granulation after extrusion.

The granules here are usually in the form of particles, usually in bead form or pellet form, depending on the granulation method. Their mean diameter is preferably from 0.1 to 6 mm, in particular from 0.4 to 3 mm.

For the impregnation, the granules are suspended in a liquid, usually water, in the presence of conventional auxiliaries and additives in a pressure container, and the latter is rendered inert and brought to a temperature which is above the softening point, but below the melting point, of the polymer. The blowing agent is injected at this temperature. After cooling and decompression, the impregnated granules are separated off, purified and dried, preferably at room temperature, for example in a stream of air. This process is described, for example, in EP-A-343 473.

Further details on conventional preparation processes are given, for example, in Kunststoffhandbuch, Volume 5, Polystyrol, edited by R. Vieweg and G. Daumiller, Carl-Hanser-Verlag, Munich, 1969.

For the production of foams, the expandable styrene polymers are expanded in a known manner by heating to temperatures above their softening point, for example by means of hot air or preferably by means of steam. The foam particles obtained can be expanded further by re-heating after cooling and, if desired, after interim storage. They can subsequently be welded to form moldings in a known manner in molds which do not seal in a gas-tight manner.

The foams obtained have densities of from 5 to 70 g/cm$^3$, in particular from 10 to 35 g/cm$^3$. They are distinguished by high elasticity. Thus, they have a resilience of up to 90% on quadruple compression, measured in accordance with DIN 53 577. They are thus clearly superior to conventional styrene polymers.

The losses of blowing agent from the unfoamed beads are very low. Even after storage for several weeks, foaming was still possible without problems.

This is all the more surprising since the loss of blowing agent in styrene polymers of comparable composition in which the polyolefin was introduced into the polymer by dissolution in the styrene monomer and polymerization of this solution, known as interpolymerization, was so great even after a very short time that foaming no longer occurred.

The prefoamed beads have a uniform cell structure and weld during molding without formation of voids. The moldings produced in this way have excellent heat distortion resistance. The foams and moldings can be recycled without problems.

The invention is illustrated in greater detail with reference to the examples below:

EXAMPLE 1

8 parts by weight of a polybutadiene having a molecular weight (Mw) of 250,000 and a content of 1,4-cis structures of 30.4% were dissolved in 92 parts by weight of styrene, and the solution was polymerized by means of free radicals by known methods.

The resultant polymer had a viscosity number of 70 cm$^3$/g, a softening point (Vicat) of 93° C. and a melt flow index of 3.7 cm$^3$/10 min at 200° C. The polybutadiene phase was distributed in the polystyrene phase in the form of cell particles having diameters of from 0.5 to 2.5 μm.

50 parts by weight of this polymer were mixed at 200° C. with 40 parts by weight of a linear polyethylene having a density of 0.92 g/cm$^3$ and a melt flow index of 1.0 cm$^3$/10 min at 190° C. and 2.16 kg (Dowlex 2045 E from Dow) and 10 parts by weight of a linear, anionically polymerized styrene-butadiene block copolymer having tapered transitions and a polybutadiene content of 26% by weight, in a twin-screw extruder from Werner & Pfleiderer, Stuttgart, and granulated to give particles measuring 2× 2×2 mm. The resultant polymer had a melt flow index of 4 cm$^3$/10 min at 200° C. and 5 kg, a softening point (Vicat) of 102° C. and a notched impact strength in accordance with DIN 53 453 of 18 kJ/m$^2$. 6000 g of this blend were introduced into a 50 l stirred reactor together with 21,000 g of demineralized water, 76 g of sodium pyrophosphate, 155 g of magnesium sulfate heptahydrate and 50 g of a 40% strength by weight solution of an alkylbenzenesulfonate (Mersolat K 30, Bayer AG). The reactor was closed, flushed twice with 1 atm of nitrogen and heated to 130° C. with stirring at 250 rpm. When this temperature had been reached, 600 g of a mixture of 80% by weight of n-pentane and 20% by weight of isopentane and 120 g of n-heptane were injected into the reactor over a period of 15 minutes, and the mixture was stirred at 130° C. for a further 10 hours. After cooling and decompression, the reactor contents were discharged. The beads were collected, washed twice with demineralized water and dried in a suction filter by sucking through ambient air at 23° C. The beads had a blowing agent content of 6.5% by weight and an internal water content of 1.3% by weight. After open storage for one day, batch prefoaming for 7 minutes by means of steam gave a bulk density of 26.7 g/l. After open storage for three days, a bulk density of 29.2 g/l. was achieved under the same prefoaming conditions. In both cases, the foam had a homogeneous, medium-fine structure.

The prefoamed beads were converted into moldings having a density of 30 g/l. Test specimens cut therefrom had, after quadruple compression by 70%, a recovery of 87% of the original thickness (determined in accordance with DIN 53 577).

EXAMPLE 2

65 parts by weight of the butadiene-styrene interpolymer from Example 1, 25 parts by weight of the linear polyethylene from Example 1 and 10 parts by weight of a linear, anionically polymerized styrene-butadiene-styrene block copolymer having tapered transitions, an asymmetrical block distribution and a polybutadiene content of 26% by weight were blended in an extruder as described in Example 1 and granulated to give particles measuring 2×2×2 mm.

The resultant polymer had a melt flow index of 4 cm$^3$/10 min at 200° C. and 5 kg, a softening point (Vicar A 50) of 102° C. and a notched impact strength in accordance with DIN 53 453 of 18 kJ/m$^2$. 4,650 g of these granules were, as described in Example 1, impregnated at 125° C. with 465 g of a mixture of 80% by weight of n-pentane and 20% by weight of isopentane and worked up. The beads had a blowing agent content of 6.4% by weight and an internal water content of 1.7% by weight. After open storage for one day, batch prefoaming for 5 minutes by means of steam gave a minimum bulk density of 33.7 g/l. After open storage for three days, a minimum bulk density of 34.8 g/l was achieved under the same prefoaming conditions. In both cases, the foam had a uniform, medium-fine structure.

The prefoamed beads were converted into moldings having a density of 33 g/l. Test specimens cut therefrom had, after quadruple compression by 70%, a recovery of 83% of the original height (determined in accordance with DIN 53 577).

Comparative Example 1

28.477 kg of demineralized water, 0.426 kg of tricalcium phosphate, 0.0038 kg of potassium dihydrogenphosphate, 0.0131 kg of disodium hydrogenphosphate 12-hydrate and 0.003 kg of the sodium salt of $C_{14,15}$-alkylsulfonic acid and finally 6.17 kg of ethylenevinyl acetate copolymer granules (2.25×1.0 mm; VA content 4%; MFI (190/2.16)=1 g/10 min; density 0.925 g/ml) containing 0.5% by weight of wollastonite (maximum particle size 16 μm, bulk density 0.28 g/cm$^3$; specific BET surface area 3 m$^2$/g; Quarzwerke GmbH, 50226 Frechen, Germany) were introduced with stirring into a 47.5 l pressure reactor. 6.17 kg of styrene, 0.0247 kg of Dresinate 214 (potassium salt of disproportionated abietic acid, Abieta Chemie, 86368 Gersthofen, Germany), 0.0617 kg of polyethylene wax ($M_n$=750; density 0.92 g/ml; drip point 105°–110° C.), 0.0617 kg of di-2-ethylhexyl phthalate and 0.0679 kg of dicumyl peroxide, 0.0123 kg of tert-butyl perbenzoate and 0.0308 kg of dibenzoyl peroxide were added to this suspension. The reactor was flushed with nitrogen and heated to 75° C., and the temperature was raised to 125° C. after 5 hours and kept there for 5 hours. For the impregnation with the blowing agent, the temperature was lowered back to 75° C., and 1.543 kg of isopentane were metered in over the course of about 3 hours. The reactor was cooled to room temperature, and 0.7 kg of nitric acid (65% strength) was added. The reactor contents were subsequently entered into a wash tank, and the crude beads were washed, sieved off and dried rapidly using air at 50° C.

Immediately after work-up, the beads contained 4.1% by weight of pentane and 0.75% by weight of water, in each case based on the total weight of the beads.

Prefoaming as described in Example 1 immediately after work-up gave a minimum bulk density of 25 g/l.

The prefoamed beads were converted into moldings having a density of 26 g/l. Test specimens cut therefrom had, after quadruple compression by 70%, a recovery of 85% of the original height (determined in accordance with DIN 53 577).

After open storage for one day, a minimum bulk density of only 31.6 g/l was achieved; after open storage for three days, the beads hardly foamed at all (486 g/l after prefoaming for 10 minutes).

We claim:

1. An expandable styrene polymer for elastic polystyrene foams, comprising
   a) from 50 to 75% by weight of polystyrene and/or a styrene copolymer containing at least 50% by weight of copolymerized styrene,
   b) from 5 to 30% by weight of at least one styrene-soluble elastomer, comprising a polybutadiene rubber,
   c) from 5 to 20% by weight of at least one block copolymer containing styrene and a polymerizable ethylenically unsaturated monomer as one component,
   d) from 15 to 50% by weight of at least one polyolefin,
   e) from 1 to 15% by weight, based on the sum of a) and b), of a low-boiling blowing agent, and, if desired,
   f) conventional additives in effective amounts.

2. An expandable styrene polymer as claimed in claim 1, wherein component b) is a styrene-soluble elastomer having a glass transition temperature of below 20° C.

3. An expandable styrene polymer as claimed in claim 1, wherein component b) is polybutadiene.

4. An expandable styrene polymer as claimed in claim 1, wherein component c) is a styrene-butadiene block copolymer.

5. An expandable styrene polymer as claimed in claim 1, wherein component c) has a styrene content of at least 20% by weight, based on c).

6. An expandable styrene polymer as claimed in claim 1, wherein component c) is a styrene-butadiene two-block copolymer.

7. An expandable styrene polymer as claimed in claim 1, wherein component c) is a styrene-butadiene-styrene three-block copolymer.

8. An expandable styrene polymer as claimed in claim 1, wherein component c) is a mixture of a styrene-butadiene two-block copolymer and a styrene-butadiene-styrene three-block copolymer.

9. An expandable styrene polymer as claimed in claim 1, wherein component d) is polyethylene.

10. An expandable styrene polymer as claimed in claim 1, wherein component d) is a mixture of polyethylene and polypropylene.

11. An elastic foam having a density of from 5 to 70 g/l, comprising
    a) from 50 to 75% by weight of polystyrene and/or a styrene copolymer containing at least 50% of copolymerized styrene,
    b) from 5 to 30% by weight of at least one styrene-soluble elastomer, comprising a polybutadiene rubber
    c) from 5 to 20% by weight of at least one block copolymer containing styrene as one component,
    d) from 15 to 50% by weight of at least one polyolefin,
    e) conventional additives in effective amounts.

* * * * *